United States Patent
Chen et al.

(10) Patent No.: US 11,870,867 B2
(45) Date of Patent: Jan. 9, 2024

(54) METHOD OF PROCESSING SERVICE DATA, ELECTRONIC DEVICE AND STORAGE MEDIUM

(71) Applicant: Apollo Intelligent Connectivity (Beijing) Technology Co., Ltd., Beijing (CN)

(72) Inventors: Mingzhi Chen, Beijing (CN); Changqing Sun, Beijing (CN); Jiangtao Bi, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/973,712

(22) Filed: Oct. 26, 2022

(65) Prior Publication Data

US 2023/0094948 A1  Mar. 30, 2023

(30) Foreign Application Priority Data

Oct. 27, 2021  (CN) .......................... 202111259022.6

(51) Int. Cl.
*H04L 67/562*  (2022.01)
*H04L 67/566*  (2022.01)
(Continued)

(52) U.S. Cl.
CPC ...... *H04L 67/562* (2022.05); *G06Q 10/06311* (2013.01); *H04L 41/0806* (2013.01);
(Continued)

(58) Field of Classification Search
CPC ..... H04L 67/562; H04L 67/34; H04L 67/566; H04L 41/16; H04L 41/0806;
(Continued)

(56) References Cited

U.S. PATENT DOCUMENTS 7,937,437 B2 * 5/2011 Fujii ................... G06F 11/2046
709/227
10,873,592 B1 12/2020 Singh et al.
(Continued)

FOREIGN PATENT DOCUMENTS

| CN | 110166278 A | 8/2019 |
| CN | 113377346 A | 9/2021 |
| CN | 113448686 A | 9/2021 |

OTHER PUBLICATIONS

Official Communication issued in corresponding Chinese Patent Application No. 202111259022.6, dated May 20, 2023.

*Primary Examiner* — Ramy M Osman
(74) *Attorney, Agent, or Firm* — Keating & Bennett, LLP

(57) ABSTRACT

A method of processing service data, an electronic device, and a storage medium are provided, which relate to a field of a computer technology, and in particular to a field of service deployment technology. The method of processing service data includes: determining, in response to receiving an operation request for a target service, a request type of the operation request; determining a target proxy module corresponding to the request type based on the request type; and sending the operation request by using the target proxy module, so that a service deployment cluster operates on the target service based on the operation request.

17 Claims, 4 Drawing Sheets

(51) Int. Cl.
*H04L 67/00* (2022.01)
*H04L 41/0806* (2022.01)
*H04L 67/63* (2022.01)
*G06Q 10/0631* (2023.01)

(52) U.S. Cl.
CPC ............ *H04L 67/34* (2013.01); *H04L 67/566* (2022.05); *H04L 67/63* (2022.05)

(58) Field of Classification Search
CPC . H04L 41/5041; H04L 67/63; G06F 9/45558; G06F 2009/45562; G06F 2009/45595; G06Q 10/06311; G06Q 10/10
See application file for complete search history.

(56) References Cited

U.S. PATENT DOCUMENTS

| | | | |
|---|---|---|---|
| 2002/0120632 A1* | 8/2002 | Gremmert | G06F 16/29 |
| 2007/0078927 A1* | 4/2007 | Yang | H04L 67/51 |
| | | | 709/203 |
| 2008/0295146 A1* | 11/2008 | Sriram | H04L 63/102 |
| | | | 726/1 |
| 2011/0161656 A1* | 6/2011 | Rao | H04L 63/0281 |
| | | | 713/168 |
| 2015/0127837 A1* | 5/2015 | Harashima | H04L 67/63 |
| | | | 709/227 |
| 2020/0160242 A1* | 5/2020 | Johnson | G06Q 10/06311 |
| 2021/0306203 A1* | 9/2021 | Landais | H04L 67/63 |
| 2021/0385291 A1* | 12/2021 | Long, III | H04L 63/102 |
| 2021/0400080 A1* | 12/2021 | Kaidi | H04L 63/0281 |
| 2023/0094948 A1* | 3/2023 | Chen | H04L 67/63 |
| | | | 709/219 |

* cited by examiner

METHOD OF PROCESSING SERVICE DATA, ELECTRONIC DEVICE AND STORAGE MEDIUM

This application claims priority to Chinese Patent Application No. 202111259022.6, filed on Oct. 27, 2021, the entire content of which is incorporated herein in its entirety by reference.

TECHNICAL FIELD

The present disclosure relates to a field of a computer technology, in particular to a field of service deployment technology, and more specifically, to a method of processing service data, an electronic device, and a storage medium.

BACKGROUND

In related technologies, when performing a service deployment, service personnel are required to have a high technical level, which may lead to a high threshold and a high cost of the service deployment.

SUMMARY

The present disclosure provides a method of processing service data, an electronic device, and a storage medium.

According to an aspect of the present disclosure, a method of processing service data is provided, including: determining, in response to receiving an operation request for a target service, a request type of the operation request; determining a target proxy module corresponding to the request type based on the request type; and sending the operation request by using the target proxy module, so that a service deployment cluster operates on the target service based on the operation request.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of processing service data as described above.

According to another aspect of the present disclosure, a non-transitory computer-readable storage medium having computer instructions therein is provided, and the computer instructions are configured to cause a computer system to implement the method of processing service data as described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Figure 1:
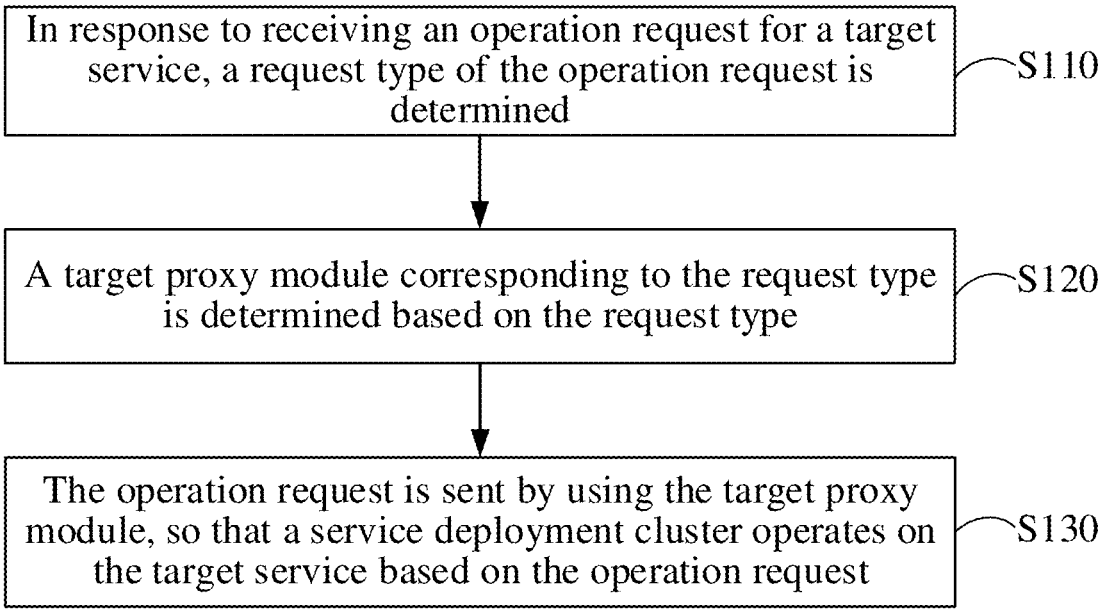
FIG. 1 schematically shows a flow chart of a method of processing service data according to an embodiment of the present disclosure.

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Terms used herein are only intended to describe specific embodiments and are not intended to limit the present disclosure. Terms "including", "containing", etc. used herein indicate the presence of the described features, steps, operations and/or components, but do not exclude the presence or addition of one or more other features, steps, operations and/or components.

All terms (including technical and scientific terms) used herein have meanings generally understood by those of ordinary skilled in the art, unless otherwise defined. It should be noted that the terms used herein should be interpreted as having the meaning consistent with the context of the present disclosure, and should not be interpreted in an idealized or overly rigid manner.

In a case that an expression similar to "at least one selected from A, B, or C" is used, the expression should generally be interpreted according to the meaning of the expression generally understood by those of ordinary skilled in the art (for example, "a system having at least one selected from A, B, or C" shall include, but is not limited to, a system having A alone, having B alone, having C alone, having A and B, having A and C, having B and C, and/or having A, B and C, etc.).

In related technologies, a service deployment is usually performed through Kubernetes (K8s for short). For example, Kubernetes is a tool for deploying an application in a containerized manner. The service deployment performed through Kubernetes may be achieved through a third-party management tool. An example of the third-party management tool includes Helm. Helm is a tool for managing Kubernetes, for example. The service deployment performed through Helm may be achieved through a helm command. Alternatively, it is possible to check a related service information through a Kubernetes command. However, the service deployment performed in a command manner may have a high technical threshold and increase a learning cost of developers.

Embodiments of the present disclosure provide a method of processing service data, and the method includes: determining, in response to receiving an operation request for a target service, a request type of the operation request;

determining a target proxy module corresponding to the request type based on the request type; and sending the operation request by using the target proxy module, so that a service deployment cluster operates on the target service based on the operation request.

Embodiments of the present disclosure provide a method of processing service data. The method of processing service data according to exemplary embodiments of the present disclosure will be described with reference to FIG. 1 to FIG. 3.

FIG. 1 schematically shows a flow chart of a method of processing service data according to an embodiment of the present disclosure.

As shown in FIG. 1, a method 200 of processing service data according to embodiments of the present disclosure may include, for example, operations S110 to S130.

In operation S110, in response to receiving an operation request for a target service, a request type of the operation request is determined.

In operation S120, a target proxy module corresponding to the request type is determined based on the request type.

In operation S130, the operation request is sent by using the target proxy module, so that a service deployment cluster operates on the target service based on the operation request.

As an example, the target service may be operated by a user through the service deployment cluster. The service deployment cluster may be Kubernetes. For example, an operation request for the target service may be initiated by the user. For example, different operation requests correspond to different request types. The request types include, for example, an installing request, an updating request, an uninstalling request, etc., for the target service.

After the operation request is received, the request type corresponding to the operation request is determined, and then a corresponding target proxy module is determined based on the request type. For example, the target proxy module is used to perform a data interaction with the service deployment cluster, so that the target service may be installed, updated, or uninstalled, etc., through the target proxy module.

For example, after the target proxy module is determined, the operation request is sent based on the target proxy module, so that the service deployment cluster may be requested to perform a related deployment operation on the target service based on the operation request.

According to embodiments of the present disclosure, the target proxy module may interact with the service deployment cluster so as to perform a deployment operation on the target service. There is no need to perform the deployment operation on the target service in the command manner, thereby reducing a technical threshold for the service deployment and a cost of the service deployment.

In another example, the deployment operation may be performed on the target service in a visual manner. For example, a control on a display page may be clicked by the user to generate an operation request, and then the operation request may be sent by the target proxy module, so that the service deployment cluster may perform the related deployment operation on the target service based on the operation request.

According to embodiments of the present disclosure, a service deployment operation may be performed in the visual manner, for example, the control displayed on the display page may be clicked by the user so that the related deployment operation may be performed on the target service. Accordingly, a convenience of the deployment operation may be improved and a technical threshold for the service deployment may be reduced.

Figure 2:
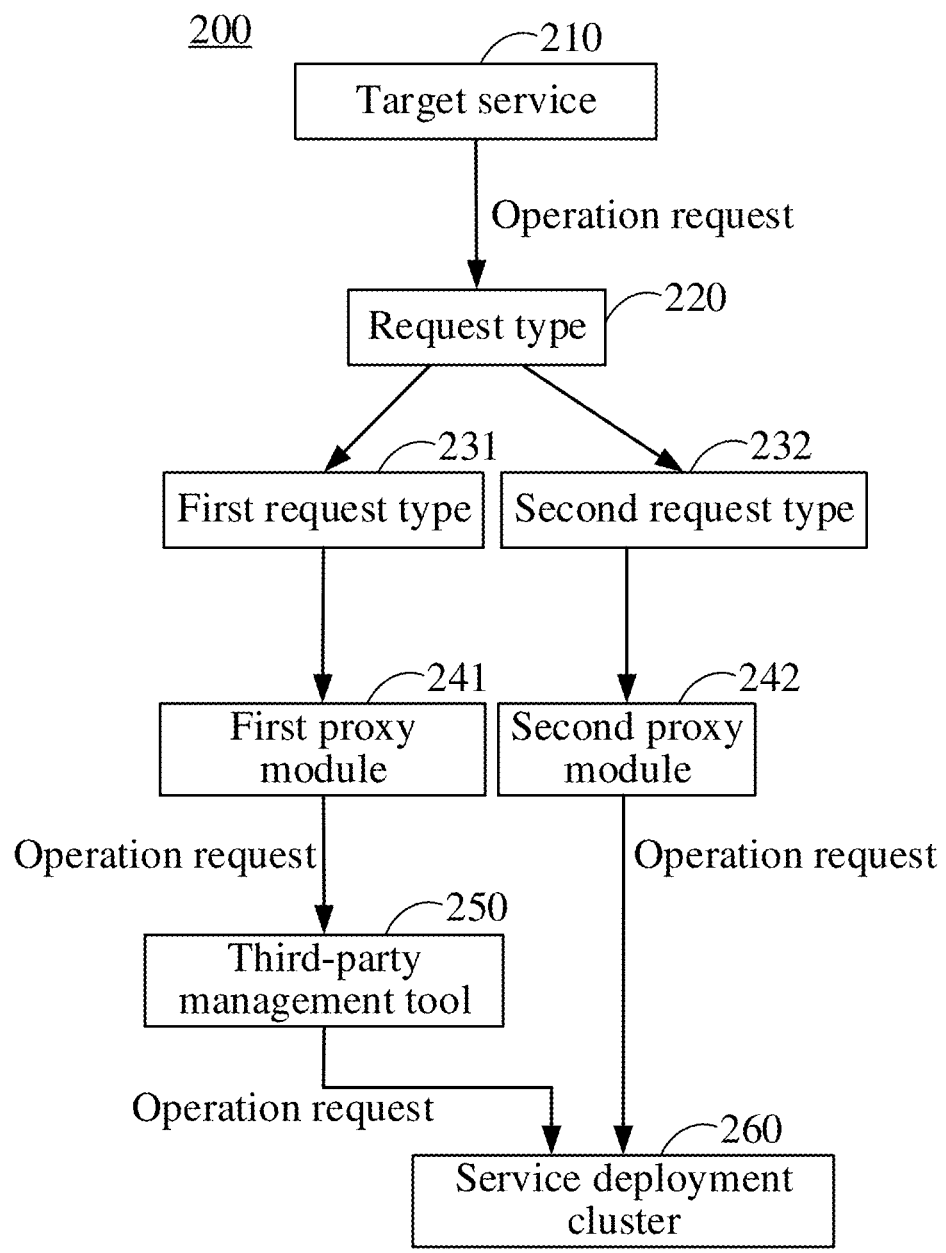
FIG. 2 schematically shows a schematic diagram of a method of processing service data according to an embodiment of the present disclosure.

FIG. 2 schematically shows a schematic diagram of a method of processing service data according to an embodiment of the present disclosure.

As shown in FIG. 2, according to an embodiment 200 of the present disclosure, a request type 220 of the operation request at least includes a first request type 231 and a second request type 232. For example, different target proxy modules may be determined based on different request types.

As an example, the first request type 231 may include, for example, an installing request type, an updating request type, an uninstalling request type, a request type for determining whether the target service exists or not, a request type for acquiring a service list containing the target service, etc. The second request type 232 may include, for example, a request type for checking a running status of a target service.

If the request type 220 for the target service 210 is the first request type 231, a first proxy module 241 associated with a third-party management tool 250 may be determined, and the first proxy module 241 may be determined as the target proxy module.

As an example, the third-party management tool 250 may be used to perform a data interaction with a service deployment cluster 260, for example. For example, in a case that the service deployment cluster 260 is Kubernetes, the third-party management tool 250 is, for example, Helm, which is a tool for managing Kubernetes.

After the first proxy module 241 is determined as the target proxy module, the operation request may be sent to the third-party management tool 250 by using the target proxy module, so that the third-party management tool 250 may forward the operation request to the service deployment cluster 260.

According to embodiments of the present disclosure, if the request type is the first request type, the first proxy module associated with the third-party management tool is determined as the target proxy module, and the operation request is sent to the third-party management tool through the target proxy module. The third-party management tool performs a data interaction with the service deployment cluster, so that the service deployment cluster may perform a deployment operation on the target service based on the operation request from the third-party management tool. It can be seen that the service deployment may be performed by sending the operation request through a proxy module, instead of using a command associated with the third-party management tool, therefore, a technical threshold for the service deployment may be reduced.

If the request type 220 for the target service 210 is the second request type 232, the second proxy module 242 associated with the service deployment cluster 260 is determined, and the second proxy module 242 is determined as the target proxy module. Then, the operation request is sent to the service deployment cluster 260 by using the target proxy module.

According to embodiments of the present disclosure, if the request type is the second request type, the second proxy module associated with the service deployment cluster is determined as the target proxy module, and the operation request is sent to the service deployment cluster through the target proxy module, so that the service deployment cluster may perform a deployment operation on the target service based on the operation request. It can be seen that the service deployment may be performed by sending the operation request through a proxy module, instead of using a command associated with the third-party management tool, therefore, a technical threshold for the service deployment may be reduced.

In embodiments of the present disclosure, corresponding target proxy modules may be determined according to different request types, and the corresponding target proxy modules may interact with the service deployment cluster in different ways, so that the service deployment cluster may perform the service deployment based on the operation request, therefore achieving the service deployment in different ways and improving a flexibility of the service deployment.

In another example of the present disclosure, when achieving the visualization of the service deployment through the display page, the target proxy module may also be used to send a configuration information associated with the target service to the display page for display. The user may modify the configuration information through a control on the display page so as to generate a modification request. Then, the target proxy module may send the modification request to the service deployment cluster, so that the service deployment cluster may modify the configuration information of the target service based on the modification request. Thus, a visual modification of the configuration information may be achieved. Different from a modification based on a command, the visual modification may improve a convenience of modification and reduce a technical threshold.

As an example, sending, by the target proxy module, the modification request to the service deployment cluster may include: sending, by using the first proxy module, the modification request to the third-party management tool; and forwarding, by the third-party management tool, the modification request to the service deployment cluster. Alternatively, the modification request may also be sent to the service deployment cluster by using the second proxy module.

Figure 3:
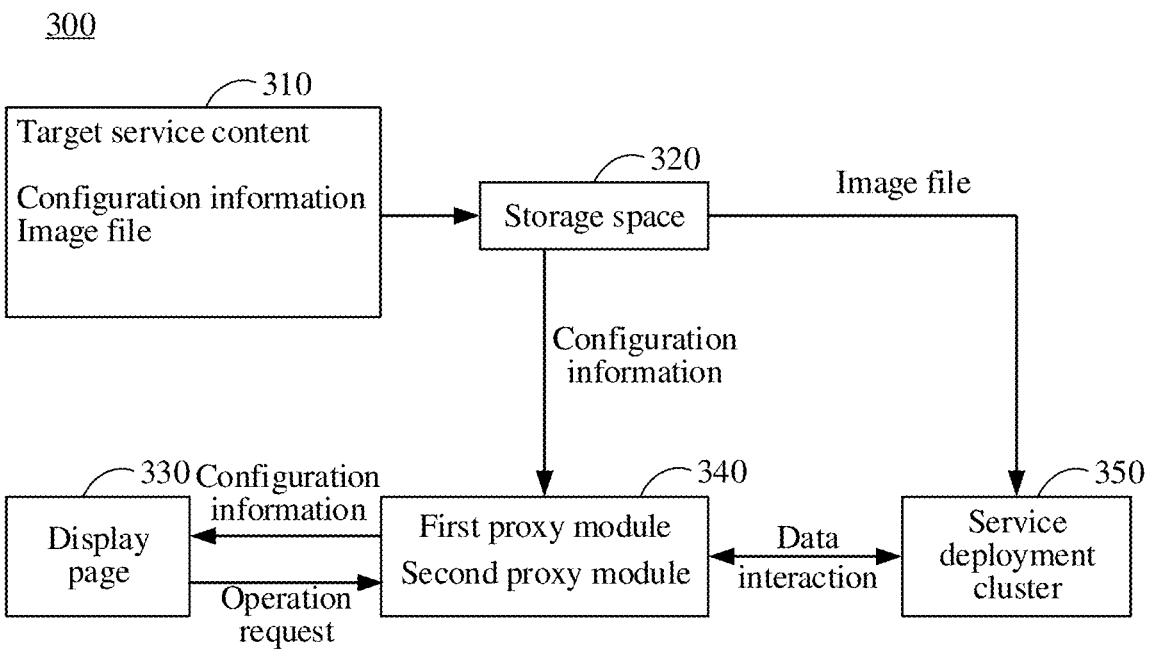
FIG. 3 schematically shows a schematic diagram of a method of processing service data according to an embodiment of the present disclosure.

FIG. 3 schematically shows a schematic diagram of a method of processing service data according to an embodiment of the present disclosure.

As shown in FIG. 3, a target service content 310 includes, for example, a configuration information for the target service and an image file for the target service. The configuration information includes, for example, a configuration description of Charts. The image file includes, for example, a service installation package of the target service.

A storage space 320 includes, for example, Harbor, and Harbor is a management warehouse used to store the configuration information for the target service and the image file for the target service.

The target proxy module 340 includes, for example, a first proxy module and a second proxy module. For the first proxy module, a Go SDK installation package in the third-party management tool (Helm) may be used to encapsulate commands of the service deployment involved in Helm as the first proxy module, and a call interface in a form of an HTTP RESTFul API interface may be provided. For the second proxy module, a command for checking a service status involved in Kubernetes may be encapsulated as the second proxy module.

The first proxy module includes, for example, a Helm HTTP API proxy module, and the second proxy module includes, for example, a K8s HTTP API proxy module. For example, the Helm HTTP API proxy module may feed back a configuration information stored in Harbor to a display page 330. The display page 330 includes, for example, a UI (User Interface) page, so that the user may modify the configuration information on the UI page. For example, the user may modify a related configuration parameter of the service deployment on the UI page.

The user may install the target service, update the target service, uninstall the target service, and check a service running status of the target service by clicking a control on the display page 330.

For example, the Helm HTTP API proxy module may interact with the third-party management tool (Helm) to achieve an interaction with a Kubernetes service deployment cluster 350 through Helm, so that operations such as an installation, an update, an uninstallation, etc. may be performed on the Kubernetes service deployment cluster 350.

For example, the K8s HTTP API proxy module may directly interact with the Kubernetes service deployment cluster 350, so that an operation of checking the service running status may be performed on the Kubernetes service deployment cluster 350. In order to check a status of a service deployed on a K8s cluster, it is possible to encapsulate a K8s API interface to obtain an HTTP API interface, and then an interaction with the HTTP API interface based on an HTTP operation request may be performed.

According to an operation request from the first proxy module, Kubernetes may download a corresponding image file from Harbor, so that Kubernetes may perform operations such as an installation, an update, an uninstallation, etc. based on the image file according to the operation request.

The display page 330 may be, for example, a visual page. The visual page may be built through HTML, Vue, Springboot and/or other technologies.

Figure 4:
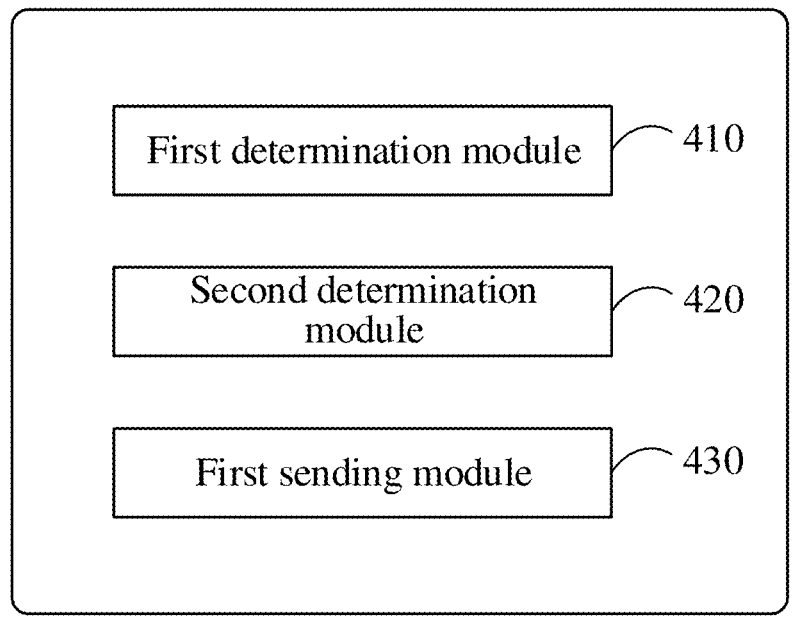
FIG. 4 schematically shows a block diagram of an apparatus of processing service data according to an embodiment of the present disclosure.

FIG. 4 schematically shows a block diagram of an apparatus of processing service data according to an embodiment of the present disclosure.

As shown in FIG. 4, an apparatus 400 of processing service data according to embodiments of the present disclosure includes, for example, a first determination module 410, a second determination module 420, and a first sending module 430.

The first determination module 410 may be used to determine, in response to receiving an operation request for a target service, a request type of the operation request. According to embodiments of the present disclosure, the first determination module 410 may perform, for example, the operation S110 described above with reference to FIG. 1, which will not be repeated here.

The second determination module 420 may be used to determine a target proxy module corresponding to the request type based on the request type. According to embodiments of the present disclosure, the second determination module 420 may perform, for example, the operation S120 described above with reference to FIG. 1, which will not be repeated here.

The first sending module 430 may be used to send the operation request by using the target proxy module, so that the service deployment cluster may operate on the target service based on the operation request. According to embodiments of the present disclosure, the first sending module 430 may perform, for example, the operation S130 described above with reference to FIG. 1, which will not be repeated here.

According to embodiments of the present disclosure, the request type includes a first request type, and the second determination module 420 includes: a first determination sub module and a second determination sub module. The first determination sub module is used to determine, in response to the request type being the first request type, a first proxy module associated with the third-party management tool, wherein the third-party management tool is used to perform a data interaction with the service deployment cluster; and the second determination sub module is used to determine the first proxy module as the target proxy module.

According to embodiments of the present disclosure, the first sending module 430 is used to: send the operation request to the third-party management tool by using the target proxy module, so that the third-party management tool forwards the operation request to the service deployment cluster.

According to embodiments of the present disclosure, the first request type includes at least one selected from: an installing request type, an updating request type, an uninstalling request type, a request type for determining whether the target service exists or not, or a request type for acquiring a service list containing the target service.

According to embodiments of the present disclosure, the request type includes a second request type, and the second determination module 420 includes: a third determination sub module and a fourth determination sub module. The third determination sub module is used to determine, in response to the request type being the second request type, a second proxy module associated with the service deployment cluster, and the fourth determination sub module is used to determine the second proxy module as the target proxy module.

According to embodiments of the present disclosure, the first sending module 430 is used to send the operation request to the service deployment cluster by using the target proxy module.

According to embodiments of the present disclosure, the second request type includes: a request type for checking a running status of the target service.

According to embodiments of the present disclosure, the apparatus 400 may further include: a second sending module and a first receiving module. The second sending module is used to send, by using the target proxy module, a configuration information associated with the target service to a display page for display; and the first receiving module is used to receive a modification request for the configuration information through a control on the display page.

According to embodiments of the present disclosure, the apparatus 400 may further include: a second receiving module used to receive the operation request for the target service through a control on the display page.

In the technical solution of the present disclosure, the collection, storage, use, processing, transmission, provision, disclosure and application of configuration information and service information involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained.

According to embodiments of the present disclosure, the present disclosure further provides an electronic device, a readable storage medium, and a computer program product.

Figure 5:
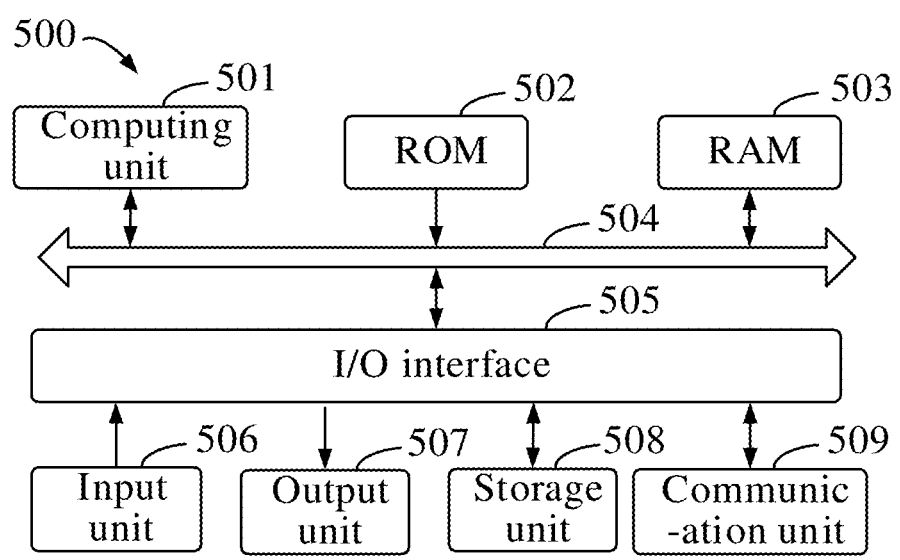
FIG. 5 shows a block diagram of an electronic device for implementing a method of processing service data according to an embodiment of the present disclosure.

FIG. 5 shows a block diagram of an electronic device for implementing a method of processing service data according to an embodiment of the present disclosure.

FIG. 5 shows a schematic block diagram of an exemplary electronic device 500 for implementing embodiments of the present disclosure. The electronic device 500 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 5, the electronic device 500 includes a computing unit 501 which may perform various appropriate actions and processes according to a computer program stored in a read only memory (ROM) 502 or a computer program loaded from a storage unit 508 into a random access memory (RAM) 503. In the RAM 503, various programs and data necessary for an operation of the electronic device 500 may also be stored. The computing unit 501, the ROM 502 and the RAM 503 are connected to each other through a bus 504. An input/output (I/O) interface 505 is also connected to the bus 504.

A plurality of components in the electronic device 500 are connected to the I/O interface 505, including: an input unit 506, such as a keyboard, or a mouse; an output unit 507, such as displays or speakers of various types; a storage unit 508, such as a disk, or an optical disc; and a communication unit 509, such as a network card, a modem, or a wireless communication transceiver. The communication unit 509 allows the electronic device 500 to exchange information/data with other devices through a computer network such as Internet and/or various telecommunication networks.

The computing unit 501 may be various general-purpose and/or dedicated processing assemblies having processing and computing capabilities. Some examples of the computing units 501 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 501 executes various methods and steps described above, such as the method of processing service data. For example, in some embodiments, the method of processing service data may be implemented as a computer software program which is tangibly embodied in a machine-readable medium, such as the storage unit 508. In some embodiments, the computer program may be partially or entirely loaded and/or installed in the electronic device 500 via the ROM 502 and/or the communication unit 509. The computer program, when loaded in the RAM 503 and executed by the computing unit 501, may execute one or more steps in the method of processing service data described above. Alternatively, in other embodiments, the computing unit 501 may be configured to perform the method of processing service data by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may send the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable service data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those of ordinary skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing service data, comprising:
determining, in response to receiving an operation request for a target service, a request type of the operation request;
determining a target proxy module corresponding to the request type based on the request type; and
sending the operation request by using the target proxy module, so that a service deployment cluster operates on the target service based on the operation request, wherein
the request type comprises a first request type, and the determining a target proxy module corresponding to the request type based on the request type comprises:
determining, in response to the request type being the first request type, a first proxy module associated with a third-party management tool, wherein the third-party management tool is configured to perform a data interaction with the service deployment cluster; and
determining the first proxy module as the target proxy module.

2. The method according to claim 1, wherein the sending the operation request by using the target proxy module comprises:
sending the operation request to the third-party management tool by using the target proxy module, so that the third-party management tool forwards the operation request to the service deployment cluster.

3. The method according to claim 1, wherein the first request type comprises at least one selected from:
an installing request type, an updating request type, an uninstalling request type, a request type for determining whether the target service exists or not, or a request type for acquiring a service list containing the target service.

4. The method according to claim 1, wherein the request type comprises a second request type, and the determining a target proxy module corresponding to the request type based on the request type comprises:
determining, in response to the request type being the second request type, a second proxy module associated with the service deployment cluster; and
determining the second proxy module as the target proxy module.

5. The method according to claim 4, wherein the sending the operation request by using the target proxy module comprises:
sending the operation request to the service deployment cluster by using the target proxy module.

6. The method according to claim 4, wherein the second request type comprises:
a request type for checking a running status of the target service.

7. The method according to claim 1, further comprising:
sending, by using the target proxy module, a configuration information associated with the target service to a display page for display; and
receiving a modification request for the configuration information through a control on the display page.

8. The method according to claim 1, further comprising:
receiving the operation request for the target service through a control on the display page.

9. An electronic device, comprising:
at least one processor; and
a memory communicatively connected to the at least one processor, wherein the memory stores instructions executable by the at least one processor, and the instructions, when executed by the at least one processor, cause the at least one processor to at least:
determine, in response to receiving an operation request for a target service, a request type of the operation request;
determine a target proxy module corresponding to the request type based on the request type; and
send the operation request by using the target proxy module, so that a service deployment cluster operates on the target service based on the operation request, wherein
the request type comprises a first request type, and wherein the instructions are further configured to cause the at least one processor to at least:
determine, in response to the request type being the first request type, a first proxy module associated with a third-party management tool, wherein the third-party management tool is configured to perform a data interaction with the service deployment cluster; and
determine the first proxy module as the target proxy module.

10. The electronic device according to claim 9, wherein the instructions are further configured to cause the at least one processor to at least:
send the operation request to the third-party management tool by using the target proxy module, so that the third-party management tool forwards the operation request to the service deployment cluster.

11. The electronic device according to claim 9, wherein the first request type comprises at least one selected from:
an installing request type, an updating request type, an uninstalling request type, a request type for determining whether the target service exists or not, or a request type for acquiring a service list containing the target service.

12. The electronic device according to claim 9, wherein the request type comprises a second request type, and wherein the instructions are further configured to cause the at least one processor to at least:
determine, in response to the request type being the second request type, a second proxy module associated with the service deployment cluster; and
determine the second proxy module as the target proxy module.

13. The electronic device according to claim 12, wherein the instructions are further configured to cause the at least one processor to at least:
send the operation request to the service deployment cluster by using the target proxy module.

14. The electronic device according to claim 12, wherein the second request type comprises:
a request type for checking a running status of the target service.

15. The electronic device according to claim 9, wherein the instructions are further configured to cause the at least one processor to at least:
send, by using the target proxy module, a configuration information associated with the target service to a display page for display; and
receive a modification request for the configuration information through a control on the display page.

16. The electronic device according to claim 9, wherein the instructions are further configured to cause the at least one processor to at least:
receive the operation request for the target service through a control on the display page.

17. A non-transitory computer-readable storage medium having computer instructions therein, wherein the computer instructions are configured to cause a computer system to at least:
determine, in response to receiving an operation request for a target service, a request type of the operation request;
determine a target proxy module corresponding to the request type based on the request type; and
send the operation request by using the target proxy module, so that a service deployment cluster operates on the target service based on the operation request, wherein
the request type comprises a first request type, and wherein the instructions are further configured to cause the computer system to at least:
determine, in response to the request type being the first request type, a first proxy module associated with a third-party management tool, wherein the third-party management tool is configured to perform a data interaction with the service deployment cluster; and
determine the first proxy module as the target proxy module.

* * * * *